United States Patent [19] [11] 3,836,983
Wood [45] Sept. 17, 1974

[54] EXPOSURE CONTROL APPARATUS
[75] Inventor: Lawrence M. Wood, Spencerport, N.Y.
[73] Assignee: Eastman Kodak Company, Rochester, N.Y.
[22] Filed: Nov. 29, 1973
[21] Appl. No.: 420,184

Related U.S. Application Data
[63] Continuation of Ser. No. 278,908, Aug. 9, 1972, abandoned.

[52] U.S. Cl. ............................................. 354/258
[51] Int. Cl. .......................................... G03b 7/08
[58] Field of Search ...................... 354/258, 51, 250

[56] References Cited
UNITED STATES PATENTS
3,412,660  11/1968  Von Wasielewski ................. 354/51
3,645,186   2/1972  Kitai .................................... 354/51

Primary Examiner—Samuel S. Matthews
Assistant Examiner—Michael L. Gellner
Attorney, Agent, or Firm—D. P. Monteith

[57] ABSTRACT

Exposure control apparatus for use in photographic equipment for providing an exposure of a light sensitive medium to light. The apparatus includes means defining an exposure aperture through which the light passes to strike the medium, and shutter means movable to define open and closed conditions of the exposure aperture. Impact means are provided for moving the shutter means to define the open and closed conditions, and light responsive, circuit means control the movement of the impact means. The impact means position the shutter means to define the open condition for an interval of time which varies in relation to the intensity of the light. During exposure in light intensity above a preselected intensity level, the circuit means control the impact means for automatically actuating the shutter means to define the open condition for a preselected interval of time.

2 Claims, 5 Drawing Figures

EXPOSURE CONTROL APPARATUS

This application is a continuation of application Ser. No. 278,908, filed Aug. 9, 1972 now abandoned.

BACKGROUND OF THE INVENTION

1. Field of the Invention

This invention relates to exposure control, and more particularly to shutter control apparatus responsive to scene light for providing an interval of exposure related to the intensity of scene light.

2. Description of the Prior Art

Cameras frequently employ shutter means which are moved from a closed to an open condition against the bias of a return spring in response to impetus received from an impact member or impeller. When the shutter means have opened, the interval of exposure may be controlled by a retard unit, such as might include an electromagnet which operates in response to a light responsive circuit to retain the shutter means in the open condition or by control the action of a latch which retains the shutter means in the open condition. The retard unit is released upon the deactuation of the electromagnet to permit the shutter means to close under the force of the return spring. The shutter means, once stopped and retained in the open condition, have an operational delay in restarting its movement to the closed condition due to mass or inertia. This delay is often compensated for by actuating the control circuit a period of time before the shutter opens, which time period is at least equal to the delay; the control circuit then deactuates the electromagnet after an exposure interval which compensates for the delay. However, during high scene light conditions the exposure interval required for proper exposure may be very short, and the adjustment of the time delay in the system is very difficult to achieve. Moreover, when exposure apparatus utilizing only electronic control is used, the operating structure is restricted to apparatus that allows proper switching of the timing circuitry in relation to the movement of the shutter means to the open condition.

SUMMARY OF THE INVENTION

Accordingly, it is an object of the present invention to provide improved exposure control apparatus which provides an exposure interval related to scene light intensity.

It is another object of the invention to provide improved apparatus that is operable in low and high scene light conditions and overcomes exposure time error due to inertia delay of the shutter means.

It is another object of the present invention to provide exposure control apparatus which automatically selects between average and high scene light to provide a variable exposure interval for average scene light conditions and selects a fixed fast shutter speed during high scene light conditions These and other objects are attained in the present invention by exposure control apparatus for use in photographic apparatus which provides an exposure of a light sensitive medium to light. The apparatus incudes means defining an exposure aperture through which light passes to strike the medium, and shutter means movable to define open and closed conditions of the exposure aperture. Means are provided for moving the shutter means to define the open and closed conditions, and circuit means, which are responsive to incident light are provided cooperate with the moving means for actuating the shutter means to define the open condition for an interval of time which is related to the intensity of the light. An inherent operational delay is in the apparatus due to the inertia of the shutter means once the shutter means is stopped to define an open condition. At high light conditions this delay may exceed the desired exposure time. Consequently, the means responsive to incident light automatically operate in cooperation with the moving means for providing a fixed exposure time, which is at least equal to the inertia delay. In a preferred embodiment of the invention a camera includes shutter means biased to a closed condition, and movable to an open condition by impact means movable upon actuation of the apparatus. The light responsive circuit means incude actuatable, timing circuit means, having photoresponsive means, for providing a signal a time interval after actuation thereof, and a transducer which is energizable by the circuit. The energized transducer means incudes armature means for retaining the impact means in a position wherein the impact means engages the shutter means in the open condition. The transducer means is de-energized upon the occurrence of the signal, where upon the armature releases the impact means to permit the shutter means to move to the closed condition.

It is a feature of my invention to provide a fixed preselected exposure interval during high light conditions, by providing means for automatically deactuating the transducer during high light conditions, so that the impact means moves to engage the shutter means and continues to move beyond engagement with the shutter means, permitting the shutter means to close after a preselected interval of time.

BRIEF DESCRIPTION OF THE DRAWINGS

The invention, and its objects and advantages, will become more apparent in the detailed description of the preferred embodiment presented below in conjunction with the accompanying drawings in which.

DESCRIPTION OF THE PREFERRED EMBODIMENT

Because photographic cameras are well known, the present description will be directed in particular to elements forming part of or cooperating more directly with the present invention, camera elements not specifically shown or described herein being understood to be selectable from those known in the art.

Figure 1:
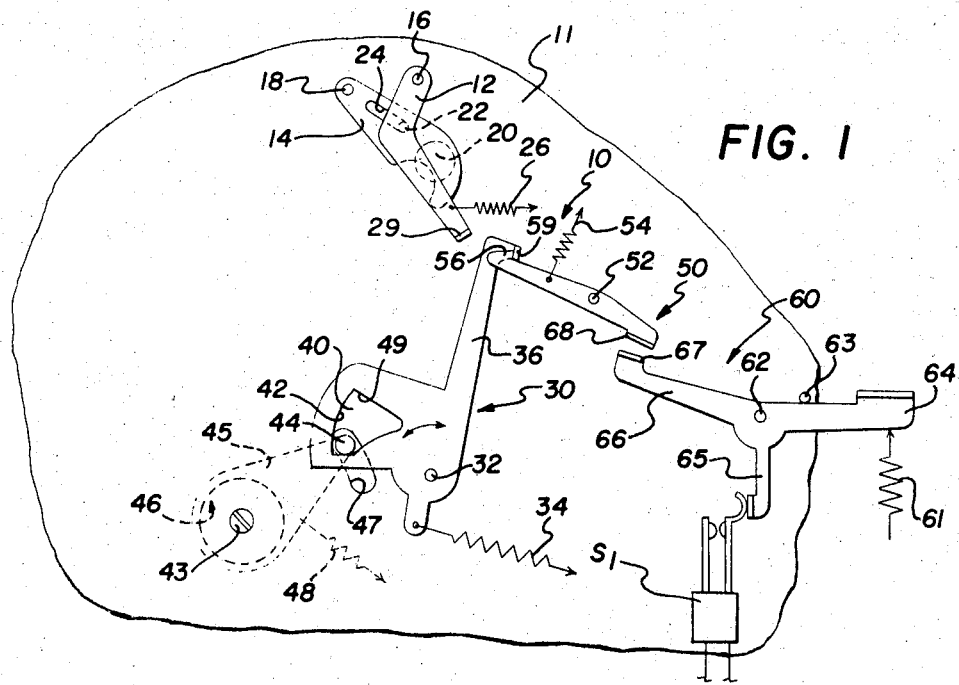
FIG. 1 is an elevational view of exposure control apparatus according to the invention, shown in the cooked position.

Referring now to FIG. 1, there is shown one illustrative embodiment of the present invention in the form of exposure control apparatus 10 which is mounted on a camera support plate 11. The apparatus includes shutter blades 12 and 14, pivotally mounted to the support plate 11 at pins 16 and 18 respectively. The blades 12 and 14 are coupled for movement in a scissor-like manner relative to an exposure aperture 20, by means of a pin 22 on the blade 12 that is received in a slot 24 of the blade 14. The blade 12 is movable against the bias of a spring 26, which for reasons to be apparent later, may be a relatively strong spring to rapdily move the blades 12 and 14 from an open to a closed condition. The closed condition refers to the position of the blades 12 and 14 as shown in FIG. 1, wherein the blades 12 and 14 block the passage of scene light through the exposure aperture 20. In the closed position, the blade 12 positions a lug 29 in the path of movement of a moving arm 36 of an impact member or impeller 30.

Figures 3, 4, 5:
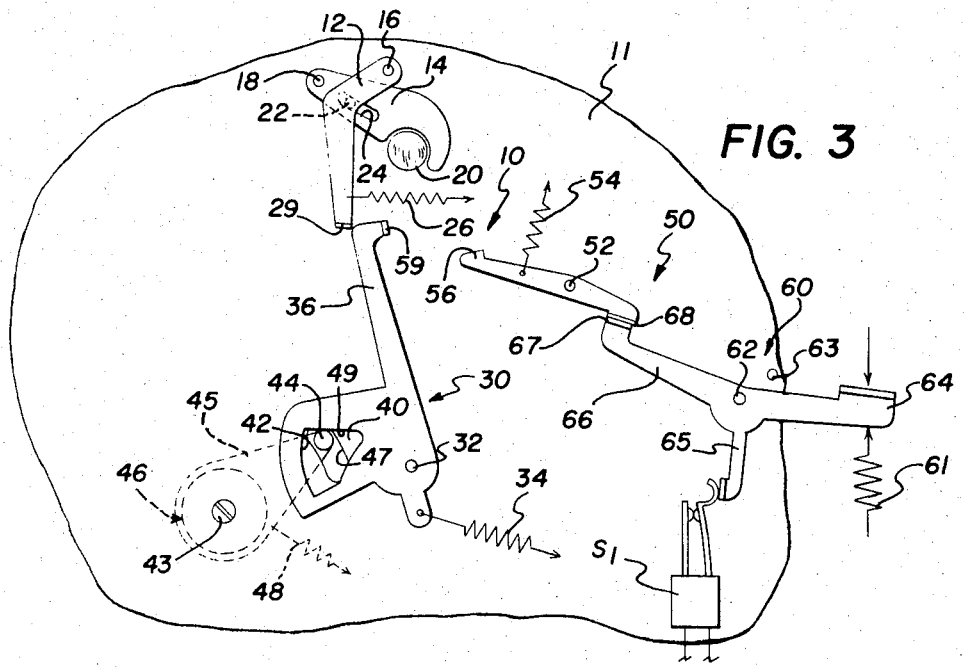
FIG. 3 is an elevational view of the apparatus of FIG. 1 shown in the actuated position wherein an impact member has been actuated to open shutter means and maintain the shutter means in an open condition.
FIG. 4 is an elevational view of the apparatus of FIG. 1 shown after the exposure interval has elapsed and the impact means has released the shutter means.
FIG. 5 is a fractional view showing a transducer and armature of FIG. 1.

In the embodiment disclosed, the impeller 30 is a rocker-like member which, upon release from the position of FIG. 1, is pivotal about a pin 32 under the influence of a spring 34. Angular momentum, generated by the pivotally moving impeller 30, is transferred to the blade 12 upon impact of arm 36 and the lug 29. The momentum thus transferred moves the blades 12 and 14 to the open position. The impeller 30 defines a cut-out section 40, providing an inner cam surface 42, upon which a cam follower 44 is disposed to move. The cam follower 44 is mounted on and movable by means of an armature 45, shown mounted beneath the plate 11 by the dotted lines of FIG. 1. The armature 45 is a magnetically attractable element that is pivotal on an adjustable screw 43, and positions the cam follower 44 to be received in a slot 47 in the plate 11. Thus the cam follower 44 will move in the slot 47 and along the cam surface 42 as the impeller 30 pivots on the pin 32. The armature 45 moves about the screw 43 under the influence of a spring 48, depending upon the state of energization of an electromagnet 46 (shown in detail in FIG. 5). During an energized state of the electromagnet 46, a magnetic field created by the electromagnet 46 retains the armature 45 in the position of FIG. 1. During a de-energized state of the electromagnet 46, the spring 48 moves the armature 45 to the position as shown in FIG. 4.

The impeller 30 is retained in the cocked position by means of a latching lever 50. The latching lever 50 is pivotal on a pin 52 for rotational movement against the bias of a spring 54. The lever 50 includes a catch 56, disposed to engage an ear 59 on the arm 36, which retains the impeller 30 in the cocked position of FIG. 1.

Release of the impeller 30 from the cocked position of FIG. 1, for movement under the influence of the spring 34, is effected by a three-armed release member 60, which is rotatably mounted on a pin 62. A restoring spring 61 urges the release member 60 against a stop pin 63 to retain it in the position shown in FIG. 1. One arm 64 may be external of the camera for manually actuating the apparatus. A second arm includes a contact surface 67 disposed adjacent to a similar contact 68 of the lever 50, and provides engagement of the contacts 67 and 68 upon depression of the arm 64. A third arm 65 extends downwardly to engage a switch S1 for actuation thereof when the arm 64 is depressed.

Figure 2:
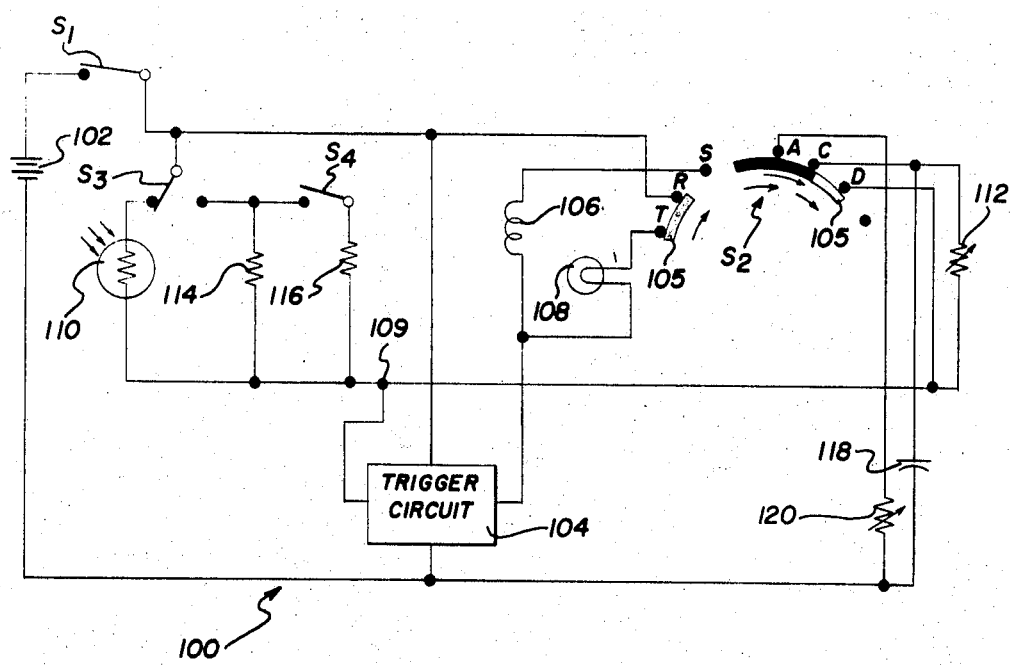
FIG. 2 is a schematic diagram of an electronic circuit which is suitable for controlling operation of the apparatus of FIG. 1.

An electronic circuit 100 which is suitable for use with the apparatus of FIG. 1, is shown in FIG. 2. The circuit 100 is energized by the closure of the switch S1 which connects a battery 102 into the circuit 100. The circuit 100 includes a trigger circuit 104, of conventional design, such as for example the well known Schmitt Trigger, which is adapted to be normally in a conductive state during average or low (for photographic purposes) scene light intensity conditions. In its conductive state, the trigger circuit 104 controls current flow through coil 106 of the electromagnet 46 or through a lamp 108, either or which may be coupled into the output of the trigger circuit 104, depending upon the position of a rotary switch S2.

The switch S2 may be for example a triple-pole, double throw switch, actuatable by the release member 60, or the switch S2 may be rotary and mechanically coupled to the impeller 30 by conventional means so that as the impeller 30 pivots, the switch S2 will rotate to move wipers 105 relative to switch contacts T, R, S, A, C, and D, to alternately connect together pre-selected contacts. When the switch S2 is positioned as in FIG. 2, switch contact pairs T-R, and A-C are connected. When the wipers 105 are moved, the contact pairs R-S and C-D are individually connected (it will be noted that the contact wiper 105 for A-C-D is a make-before-break wiper). When the switch contacts A-C are connected (connected may also be referred to as "made"), the trigger circuit 104 controls the energization of the lamp 108, through switch contacts T-R, which may be used as warning of an existing low light condition. When the contacts R-S are made, the trigger circuit 104 controls the flow of current in the coils 106, thereby controlling energization or de-energization or the electromagnet 46, and thus the exposure interval, which will be explained later.

The choice of the exposure interval is related to selected time constants which are established by selective circuit elements in relation to the position of the switch S2, and to the position of additional switches S3 and S4.

As the switches are operated, the circuit 100 establishes a voltage level related to the exposure interval for switching the trigger circuit 104 from the conductive to the nonconductive state during a variety of scene light conditions, such as for example during illumination by artificial means or during varying scene light intensity conditions. An exposure interval which is dependent upon the scene light intensity is established when a capacitor 118 is coupled in series circuit with a photocell 110 to form a conventional RC integrating circuit having a time constant dependent upon the resistance of the photocell 110 and the capacitance of the capacitor 118. Resistors 114, 116 associated with switches $S_3$ and $S_4$ and the photocell 110 also form elements of other circuits which provide for selective fixed time constants.

Initially, the switch $S_2$ is in the position shown in FIG. 2, and the voltage at a junction 109 depends upon the voltage divider circuit comprising the photocell 110, the variable resistor 112, and a second variable resistor 120, all of which are connectable in series circuit with the battery 102 through contacts A-C. This voltage divider circuit is adjustable through resistors 112 and 120 to provide a voltage at the junction 109 that will initially trigger the circuit 104 to the nonconductive state if the resistance of photocell 110 is low (as during a high scene light condition). On the other hand, actuation of switch S2 to make the contacts C-D, removes the variable resistors 112 and 120 from the circuit and couples the capacitor 118 in series with only the photocell 110. This combination provides a voltage at the junction 109 which triggers the trigger circuit 104 to the nonconducting state after a time interval which is variably related to the intensity of scene light. When the contacts C-D are made, and also the switch $S_3$ is actuated to connect resistor 114 in circuit with the capacitor 118, by for example insertion of a flash lamp unit into the camera (not shown), a fixed interval of exposure in the order of 1/30 sec. is established by the series combination of resistor 114 and the capacitor 118. The exposure interval may be varied from the 1/30 sec. by actuation of the switch $S_4$, as for example during focus control for exposure at shortened distances, wherein the resistance 116 is coupled in parallel with the resistor 114 for providing time interval of exposure which is established by the parallel combination of the resistors 114 and 116 in series with the capacitor 118.

The operation of the apparatus will first be described in an electronically timed mode of operation, for exposure during average or, if desired, low scene light, and may be understood by reference to FIGS. 3, 4 and 5 in conjunction with FIGS. 1 and 2. Initially, an operator slightly depresses the external arm 64 which rotaes the release member 60 in a clockwise direction about the pin 62. As the release member 60 rotates, the switch $S_1$ is closed by the arm 65, and battery power is applied to the circuit 100. The switch contacts A-C and R-T are as shown in FIG. 1, i.e., the lamp 108 is in circuit with the trigger circuit 104 and a voltage level at the junction 109 is established which depends upon the resistances of the photocell 110 and the resistors 112 and 120. The relative values of resistance may be adjusted (the resistors 112 being variable) such that if scene light is low, the resistance of the photocell 110 will be high and consequently the voltage level at the junction 109 may be set so that the conduction of the trigger circuit 104 is not affected and the lamp 108 is energized to indicate that a low-light condition exists. At this point the operator has the option of inserting a flash lamp unit to establish the fixed exposure interval by the closure of the switch $S_3$. The operator may continue to depress the release member 60 and initiate an exposure, however, due to the existing low light condition the exposure interval may be too long for a hand-held camera. In the event that the scene light is average the voltage level at the junction 109 will be such that the lamp will not become energized upon the initial depressing of the arm 64, and the operator may continue to depress the release member 60. As seen from FIG. 2, the continued rotational movement of the release member 60 brings the contacts 67 and 68 together and the latching lever 50 is rotated counterclockwise about the pivot pin 52, releasing the ear 59 from the catch 56. The spring 34 pivots the impeller 30 in a counterclockwise direction bringing the arm 36 into engagement with the lug 29, the impact of which moves the pin 22 in the slot 24 and the blades 12 and 14 open in scissor-like fashion against the bias of the spring 26.

As previously suggested, the impeller may be coupled to the switch $S_2$ so that the movement of the impeller 30 rotates the switch $S_2$ to make the switch contacts C-D to disconnect the variable resistor 120 from the photocell 110, capacitor 118 and variable resistor 112, thereby initiating the timing by closing a path for current flow from the battery 102 to charge the capacitor 118 through the photocell 110, and to make the contacts R-S coupling the electromagnet 46 in circuit with the trigger circuit 104. The magnetic field of the electromagnet 46 holds the armature 45 as the impeller pivots; therefore, the cam follower 44 moves along the cam surface 42 and abuts an angle 49, arresting the movement of the impeller 30 with the arm 36 engaging the lug 29. Consequently, the blades 12 and 14 are held in the position as shown in FIG. 3. When the voltage level at the junction 109 reaches a predetermined level, the trigger circuit 104 is switched from the conducting to the nonconducting state, and the flow of current through the coil 106 is terminated thereby deenergizing the electromagnet 46. When the electromagnet 46 deenergizes, the magnetic field collapses and the armature 45 is released for movement under the influence of the spring 48, removing the cam follower 44 from the angle 49. The disengagement of the cam follower 44 from the angle 49 release the impeller 30 for continued movement in the counterclockwise direction, under the influence of the spring 34, and the arm 36 releases the blade 12; the blades 12 and 14 then close under the influence of the spring 26 as shown in FIG. 4.

The operation of the apparatus in the electronically time mode as previously described has an inherent delay in operation of from 3.5 to 6 msec. due to inertia of the moving parts. Therefore, in order to accomplish an exposure for an interval in the order of for example 8 msec. (1/125 sec.), the electronic circuitry must initiate the release of the impeller 30 from the lug 29 prior to the actual desired exposure termination point of time, thereby taking into account the inertia delay. For the example given, the release intiation may be at a time 4 msec. prior to the end of the exposure. However, during high scene light intensity conditions, such as for example 2,000 foot lamberts (the exposure aperture dimensions, film speed, etc. being constant), an exposure interval of approximately 4 msec. 1/250 sec. may be required. Thus it may be seen that the exposure interval is equal to or shorter than the inherent inertia delay in the system. In keeping with the objects of the invention, the apparatus provides for an exposure interval during high scene light conditions which is not subject to the inertia delay by providing a fixed shutter speed having an interval of time which may be equal to or less than the inertia delay.

The operation of the apparatus during high scene light conditions, however, is similar to that of the average scene light conditions. During high scene light conditions the resistance of the photocell 110 is low and the resistance of an initializing resistor 120, in parallel circuit with the capacitor 118, has been preset to a value which establishes an initializing charge on the capacitor 118. During high scene light intensity, the initial charge is equal to or above the voltage level required to switch the trigger circuit 104 to the nonconducting state. As a result of this initializing charge, the trigger circuit 104 is immediately switched to the nonconducting state as the switch $S_2$ is rotated to make switch contacts C-D. The electromagnet 46 is accordingly de-energized during the initial pivotal motion of the impeller 30. With the electromagnet 48 initially de-energized, the spring 46 biases the armature 45 clockwise, and the cam follower 44 does not arrest the motion of the impeller 30 to retain the blades 12 and 14 in the open position. Therefore, automatically after impact of the arm 36 and the blade 12, the arm 36 moves beyond the blade 12, as shown in FIG. 4, and the spring 26 rapidly closes the blades 12 and 14. Thus a fixed shutter speed is established which is dependent upon the engagement of the impeller 30 with the lug 29, and the strength of the spring 26.

This invention has been described in detail with particular reference to preferred embodiments thereof, but it will be understood that variations and modifications can be effected within the spirit and scope of the invention.

I claim:

1. For use in a camera, exposure control apparatus for controlling the exposure of a light sensitive medium to scene light, said apparatus comprising:

shutter means movable between open and closed conditions for controlling the passage of the scene light to expose the medium;

means for urging said shutter means to said closed condition;

impact means movable from a first position to a second position for engaging and moving said shutter means to said open condition;

means releasably retaining said impact means in said first position;

circuit means including actuatable photoresponsive timing means adapted to receive light for providing a signal a time interval after actuation thereof, said interval being related to the scene light intensity;

means for actuating said photoresponsive timing means; and means responsive to said circuit means for retaining said impact means in said second position so that shutter means remains in said open condition, said impact retaining means being responsive to said signal for releasing said impact means to permit said shutter means to move to said closed condition.

2. For use in a camera, exposure control apparatus for controlling the exposure of a light sensitive medium to scene light, said apparatus comprising:

shutter means movable between open and closed conditions;

means for urging said shutter means to said closed condition;

impact means, movable from a first position through a second position to a third position, said impact means being operably associated with said shutter means for moving said shutter means to said open condition during movement to said second position, for retaining said shutter means in said open condition while in said second position and for allowing the closing of said shutter means upon movemnet from said second position toward said third position;

means for urging said impact means toward said third position;

means for releasably retaining said impact means in said first position; and means responsive to scene light for maintaining said impact means in said second position for an interval of time related to the intesnity of the scene light and for thereafter permitting said impact means to move to said third position.

* * * * *

UNITED STATES PATENT OFFICE
CERTIFICATE OF CORRECTION

Patent No. 3,836,983　　　　　　　　　　Dated　September 17, 1974

Inventor(s)　Lawrence M. Wood

It is certified that error appears in the above-identified patent and that said Letters Patent are hereby corrected as shown below:

Column 2, line 44, "cooked" should read -- cocked --. Column 5, line 25, "rotaes" should read -- rotates --; line 35, "112 being" should read -- 112 and 120 being --. Column 8, line 22, "movemnet" should read -- movement --; line 30, "intesnity" should read -- intensity --.

Signed and sealed this 19th day of November 1974.

(SEAL)
Attest:

McCOY M. GIBSON JR.　　　　　　　　C. MARSHALL DANN
Attesting Officer　　　　　　　　　　Commissioner of Patents